(No Model.)
C. MEARS.
CHURN.
No. 461,247. Patented Oct. 13, 1891.
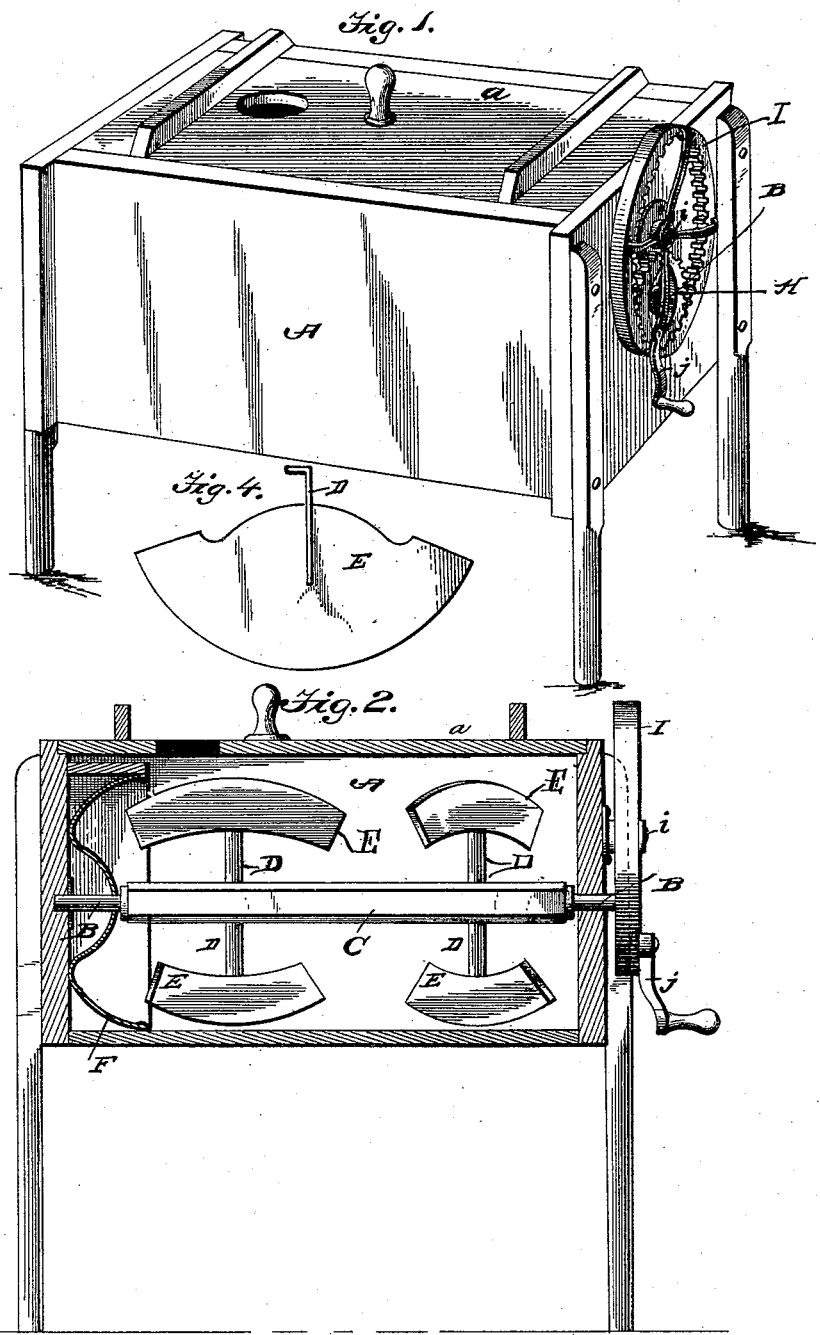
Witnesses:
Inventor:
Camden Mears,
By
Chas. E. Barber,
Attorney.

UNITED STATES PATENT OFFICE.

CAMDEN MEARS, OF BLOOMSBURG, PENNSYLVANIA.

CHURN.

SPECIFICATION forming part of Letters Patent No. 461,247, dated October 13, 1891.

Application filed June 20, 1890. Serial No. 356,050. (No model.)

*To all whom it may concern:*

Be it known that I, CAMDEN MEARS, a citizen of the United States, residing at Bloomsburg, in the county of Columbia and State of Pennsylvania, have invented certain new and useful Improvements in Churns, of which the following is a full and complete description, reference being had to the accompanying drawings, which illustrate my invention and form a part of this specification.

Figure 1 is a perspective view of the churn. Fig. 2 is a central vertical longitudinal section. Fig. 3 is a transverse section through the cover, and Fig. 4 is a modified form of dasher-blade.

The objects of the invention are to provide a churn easy of operation and capable of being operated with the least expenditure of force, either physical or mechanical, one in which the churning operation can be completed in the shortest possible time, and one in which the maximum amount of butter can be produced from a given quantity of cream.

A designates the body of the churn, which, as shown in the drawings, has the external shape of a rectangular box with a removable cover *a*. Journaled in the ends of the box is a revoluble shaft C, centrally disposed, one of the journals of which project, through the end for the application of power thereto to rotate the shaft.

D D designate arms or spokes, which extend from the shaft at right angles and preferably in the same radial plane. Upon the outer ends of the arms or spokes D are secured dasher-blades E E. These blades are made in the shape of sectors of a flat ring, their width being such as to give the required action, and are set upon the arms D at an angle to the axis of the shaft C, after the manner of the blades of a propeller. When the shaft is rotated, the blades will agitate the contents of the churn and will throw the same toward the end, or in the direction of the line of the shaft.

In order to give the greatest amount of agitation to the contents of the churn a double-curved plate F, having an inner concavity concentric with the shaft, is placed in the end of the churn. The cream is thrown against this plate by the blades E, and is deflected by the curved surface and thrown back into the path of the blades to be churned over. Thus the greatest amount of agitation is given the cream, with the corresponding result that the churning operation is completed and butter produced in shortest time, whereby a saving of both time and labor is effected. When the churning operation is completed, the cover *a* is removed and the contents taken out and treated in the usual manner.

Instead of making the blades E as shown in Fig. 2 they may be made in the shape shown in Fig. 4, with the arms D formed integrally therewith or permanently attached thereto. In this case the arms may be removably set into the shaft for convenience in washing and cleansing the churn.

The shaft C may be driven in any convenient manner, as by the application of steam or animal power through belting or gearing or by hand through a crank on the journal. As a means for rotating it at a high rate of speed I show a small gear-wheel H on the journal of the shaft, which gear is in mesh with an internal gear I, mounted on a spindle *i*, projecting out from the body of the churn, the gear I being provided with a crank-arm *j*, by which it is adapted to be turned by hand.

In order to avoid as much as possible sharp corners in the interior of the churn, I preferably concave the inner surface of the top, bottom, and sides, as represented in Fig. 3, which shows a section of the removable cover. This gives the interior approximately a cylindrical shape, whereby the cream is more closely confined and held within the reach of the blades at all points.

Having now described my invention, what I claim is—

The combination, with the body of the churn, of a rotatable shaft therein, journaled in the ends and provided with radial arms or spokes carrying blades or dashers set at an angle to the axis of the shaft, the inner face of one end of the churn-body having an annular concavity concentric with the shaft, substantially as and for the purpose described.

In testimony whereof I affix my signature in the presence of two witnesses.

CAMDEN MEARS.

Witnesses:
 B. FRANK ZARR,
 G. M. QUICK.